(12) United States Patent
Hrabal

(10) Patent No.: US 7,117,731 B2
(45) Date of Patent: Oct. 10, 2006

(54) DEVICE FOR MONITORING MAINTENANCE AND ADJUSTMENT OF PRESSURE IN A TIRE

(76) Inventor: Frantisek Hrabal, Nezamyslova 10, 128 00 Prague 2 (CZ)

(*) Notice: Subject to any disclaimer, the term of this patent is extended or adjusted under 35 U.S.C. 154(b) by 0 days.

(21) Appl. No.: 10/498,145

(22) PCT Filed: Dec. 5, 2002

(86) PCT No.: PCT/CZ02/00064

§ 371 (c)(1),
(2), (4) Date: Jun. 8, 2004

(87) PCT Pub. No.: WO03/049958

PCT Pub. Date: Jun. 19, 2003

(65) Prior Publication Data

US 2005/0126273 A1    Jun. 16, 2005

(30) Foreign Application Priority Data

Dec. 11, 2001 (CZ) .............................. PV2001-4451
Apr. 18, 2002 (CZ) .............................. PV2002-1364

(51) Int. Cl.
*G01M 17/02* (2006.01)
(52) U.S. Cl. ........................................................ 73/146
(58) Field of Classification Search ................. 73/146, 73/146.2, 146.3, 146.4, 146.5, 146.8; 152/415, 152/424; 340/442
See application file for complete search history.

(56) References Cited

U.S. PATENT DOCUMENTS

| 4,432,405 A | * | 2/1984 | Grushkin ..................... 152/424 |
| 4,922,984 A | * | 5/1990 | Dosjoub et al. ............. 152/415 |
| 5,052,456 A | * | 10/1991 | Dosjoub ..................... 152/415 |
| 6,894,607 B1 | * | 5/2005 | Claussen et al. ............. 340/442 |

FOREIGN PATENT DOCUMENTS

| DE | 98 536 A | 3/1897 |
| RU | 2 106 978 A | 3/1998 |

* cited by examiner

*Primary Examiner*—Edward Lefkowitz
*Assistant Examiner*—Andre Allen
(74) *Attorney, Agent, or Firm*—Egbert Law Offices

(57) ABSTRACT

Device for monitoring, maintenance and/or adjustment of pressure in a tire includes the chamber with shape memory deformable for the period of application of external mechanical forces when the tire rolls on the road surface, connected valve with the inside space of the tire and valve with the outside environment. At least one wall of the chamber is adjacent to the inside wall of the tire or is a part of the inside wall of the tire. Furthermore, the device operates on the peristaltic pump principle consisting of the chamber, which is deformable up to the zero cross section. At least one chamber with block with shape memory is freely open at one end and equipped with at least one valve at the other end or next to it. The minimum volume of the part of the chamber at the end equipped with the internal valve or external valve is from 1 to 80% of the total maximum volume of the chamber.

13 Claims, 7 Drawing Sheets

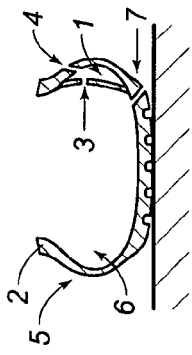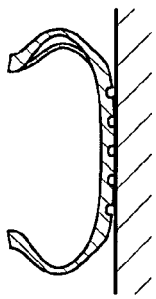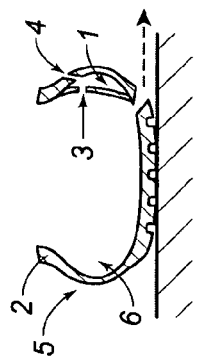
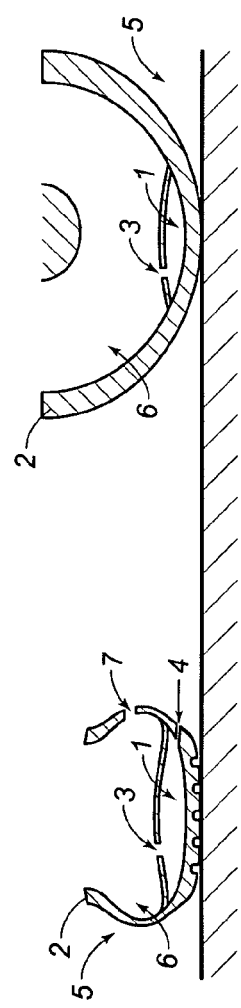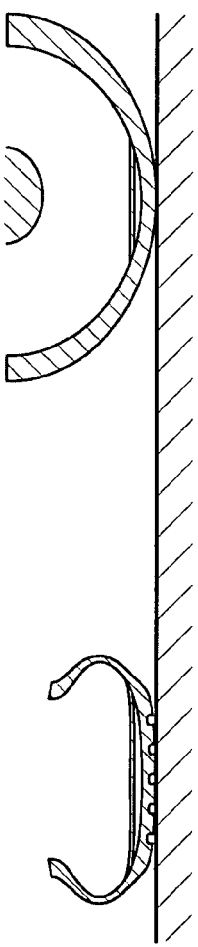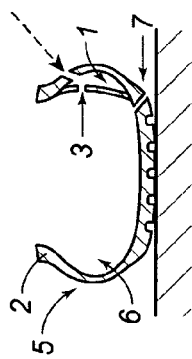
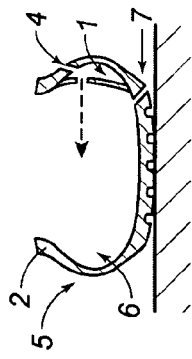

DEVICE FOR MONITORING MAINTENANCE AND ADJUSTMENT OF PRESSURE IN A TIRE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The invention deals with monitoring, maintenance and adjustment of pressure in a tire in dependence on current or long-term way of its usage.

BACKGROUND OF THE INVENTION

Tires are usually inflated with gas when the vehicle is stopped, by external compressors and pumps nowadays. These inflation methods are time consuming and require periodical checks of pressure, which the users often fail to observe.

These methods moreover do not ensure optimum inflation of a tire in a situation when the current driving manners differ from the manner the tire was originally inflated for. This affects either the tire itself by extensive wear, or safety, as the tire is not always able to perform as it should e.g. as a result of lower pressure to road surface. The economical point of view is also significant. A badly inflated tire has higher rolling resistance, which increases fuel consumption.

Another method of inflating tires is based on inflating during driving by compressors located in the vehicle. This solution is relatively complicated, it requires a compressor in the vehicle, and transfer of compressed air to the rotating wheel is also complicated.

From the American U.S. Pat. No. 4,432,405 we know a device for pumping tires during driving, consisting of a temporarily deformable bellow, or say a cuff attached to a tire from the outside. The bellow is connected with the inside with a hose equipped with a valve and the second valve connects it with outside environment with atmospheric pressure. This device is attached to the tire with a belt, which is not very convenient and may threaten the traffic safety.

The Russian patent 2106978 presents a device for automatic pumping (inflation) of tires. The device working on the principle of peristaltic pump consists of a deformable chamber inside a tire in the casing or next to the inside wall of the tire on the wall of the tire tube. Deformation of the chamber is caused by rolling of the tire on the road surface. One end of the chamber is connected with the outside environment via a pressure regulator-a hose which shrinks and gets closed at particular ambient pressure, and the second end of the chamber is connected to the inside of the tire via a one-way valve. The described pressure regulator works in principle as a double-way valve. If the pressure in the tire the shrinkable hose connecting the deformable chamber with the outside environment goes through is lower than the critical value of the shrinkable hose is, the gas passes freely through the shrinkable hose in both directions. When the pressure inside the tire exceeds the critical value of the shrinkable hose, this deforms and does no longer enable the chamber to suck gas from the outside environment. On the other end of the deformable chamber there is a valve connecting the chamber with the outside environment of the tire and letting the gas flow from the chamber to the tire only, if the pressure inside the chamber exceeds the pressure inside the tire. When the tire is rolling the part of the chamber originally deformed returns to its original position and sucks the air from the outside environment through the shrinkable hose until it is deformed and closed by predefined pressure in the inside space of the tire. No further air is sucked and the device does not pump the tire until the inside pressure drops under predefined value. Manufacturing of the shrinkable hose and adjustment of the moment of its deformation and thus the maximum pressure in the chamber is technologically demanding.

If the pressure in the tire does not reach the value necessary for inflation of the tire until the end of the working cycle and the shrinkable hose connecting the deformable hose with the outside environment is not closed, the whole inside of the deformable hose is connected with the outside atmosphere before the start of a new cycle, so the pressure inside the whole hose drops to the value of atmospheric pressure. The chamber then starts each cycle repeatedly with just the atmospheric pressure of the outside environment.

Another Russian patent application 94031574 A1 describes a hose-shaped elastic chamber located on the inside wall of the wheel rim axially with the wheel outside the tire. A thrust pulley moves along the hose, which gradually presses the air into the inside of the tire via a non-return valve and also to an additional hose-an appendix, similarly to the peristaltic pump. The other end of the hose sucks the air from the outside until the sucking hole gets closed by the expanded appendix.

The device is relatively complicated.

The patents U.S. Pat. Nos. 4,922,984 and 5,052,456 describe devices for inflating and deflating of a rotating tire consisting of a deformable hose attached to the tire, while the hose at least partly copies the tire circumference. The deformable hose is located outside the tire, for example on the wheel rim, or inside the tire on a special holder. In the first instance, a pulley rolls on the deformable hose, in the latter the hose is pressed between the holder and the tire inside wall as a result of movement of the tire on a road. One end of the hose is open to the atmosphere and the other is connected to the inside of the tire through a one-way valve. Deflation of the tire is ensured by a mechanical factor, which when activated opens the above-mentioned one-way valve for the period of each revolution and deflates the tire.

A chamber designed this way, with just one non-return valve, like the patent RU 2106978 does not enable cumulating of gas in the chamber for more cycles.

BRIEF SUMMARY OF THE INVENTION

The above disadvantages are removed by the device for monitoring, maintenance and adjustment of pressure in a tire consisting of a chamber with shape memory, deformable in volume for the period of application of outside mechanical forces by rolling the tire on a road surface, connected with at least one one-way valve with the inside space of the tire, and at least by one one-way valve with the outside environment, which is based on the invention that at least one wall of the chamber neighbors with the inside wall of the tire or is a part of the side of the tire.

The length of the chamber is advantageously bigger than the length of the optimum contact area of the tire with road surface.

The chamber may consist of at least two independent and mutually interconnected spaces arranged symmetrically on the opposite sidewalls of the tire.

Further device for monitoring, maintenance and adjustment of pressure in a tire working on the principle of peristaltic pump, consisting of a chamber with shape memory deformable in volume for the period of application of outside mechanical forces by rolling the tire on a road surface, having lengthwise shape at least partly copying the tire case shape, connected with the inside space of the tire and the outside environment, at least one wall of which neighbors with the tire wall or is its part, while a part of the chamber is deformable up to zero extent of the chamber cross section, is according to the invention based on the fact that at least one chamber with block with shape memory is freely open at one end and fitted with at least one valve at the other end, while a part of the chamber with block is deformable up to the zero cross section of the chamber.

The chamber of such a device is equipped with at least one internal valve connecting the chamber with the inside space of the tire or at least one outside valve connecting the chamber with the outside environment.

The minimum volume of the part of the chamber (1) at the end equipped with the internal valve (3) or external valve (4) is from 1 to 80% of the total maximum volume of the chamber (1).

Part of the chamber is located outside the application of external forces deforming the chamber up to the zero cross section of the chamber.

The device has the advantage to contain at least one first sensor chosen from the group consisting of a tire press sensor, a tire profile sensor, a chamber profile sensor, a chamber volume sensor, a sensor of difference between the pressure inside the chamber and the tire inside space pressure, or a sensor of the difference between pressures inside the chamber and the outside environment pressure, and possibly at least one second sensor chosen from the group consisting of a tire velocity sensor or a tire acceleration sensor.

The internal valve and/or the external valve are interconnected with a control connected to the first sensor and/or the second sensor.

The chamber is periodically pressed when the wheel rolls on the road and it causes higher pressure inside the chamber than inside space of the tire followed by lower pressure than in outside environment of the tire. In co-operation with the valves possibly controlled by the control upon information gained from the sensors the air moves between all these spaces and the tire gets inflated.

With the device operating on the principle of peristaltic pump the mechanical forces generated when the tire rolls on the road surface deform a part of the chamber up to the zero cross section. The volume closed in the chamber before that gets smaller. The part of the chamber to which the mechanical force Fe does not apply or stops applying gets thanks to the block with shape memory back fully or partly to the shape before application of force Fe. The inside space of the chamber before the zero cross section is connected with the inside space of the tire through an internal valve, which lets the medium inside the tire and inflates it after reaching overpressure in the chamber.

If the chamber is equipped with an external valve at the connection of the chamber and the outside environment, and is freely open to the inside space of the tire, the place of application of Fe on the chamber walls shifts in the direction from the external valve connecting the chamber with the outside environment to the free connection of the other part of the chamber with the inside space of the tire. The volume of the part of the chamber after the zero cross section expands and is filled with the medium from the outside environment through the valve.

After fade out of the force Fe applied on the chamber and closing the external valve the pressures inside the chamber and inside space of the tire gets balanced. The total pressure inside space of the tire increases.

The pressure in the chamber rises geometrically. Rapidly growing pressure might damage the chamber.

This may be prevented by making a chamber, which is not deformable by external forces at the end equipped with the internal or external valve up to the zero cross section of the chamber. The minimum volume of this part of this chamber is from 1 to 80% of the total maximum volume of the chamber (1).

The growth of pressure in the chamber over the critical value may then be prevented or the maximum compression may be limited by locating a part of the chamber outside the application point of the external forces Fe.

The device according to the invention has an advantage, that it exploits a part of the energy consumed by an under-inflated tire for getting over higher rolling resistance of an under-inflated tire to partial or full removal of this state and inflation of the tire.

The device has a simple design and is placed inside a tire, where it works without requirements for energy supply, without need of bigger space. No special treatment of wheel rims is necessary for its function and installation.

The device reduces or completely eliminates the need of manual check and tire pressure adjustment or its initialization by an operator of automated check and inflation The device adjusts the pressure in a tire during its operation, which reduces or fully eliminates the time and work consumption spent on manual or automated inflation from external pumps and compressors.

One of the variants of the device is able to monitor the driving style and adjust the optimum tire pressure by means of controls. The device reduces fuel consumption, increases safety and extends the tire life.

The device based on the peristaltic pump has only one valve, which is simple from the design point of view. The valve position may be moreover similar to that of an external valve, which is a part of a common tire now.

BRIEF DESCRIPTION OF THE SEVERAL VIEWS OF THE DRAWINGS

FIG. 1*a*) shows a cross-sectional view and side view of an unloaded tire, where the chamber connected through a one-way internal valve with the inside space of the tire and through a one-way external valve with the outside environment is located inside the tire next to the tire tread.

FIG. 1*b*) shows a cross-sectional view of an unloaded tire, where the chamber is located inside the tire, next to its sidewall.

FIG. 2*a*) shows a cross-sectional view and a side view of a loaded tire, where the chamber is located inside the tire next to the tire tread. The chamber volume is made smaller by the tire deformation.

FIG. 2*b*) shows a cross-sectional view of a loaded tire, where the chamber is located inside the tire next to the tire sidewall. The chamber volume is made smaller by the tire deformation.

FIG. 3. shows a cross-sectional view of a tire, wherein a broken line shows penetration of gas through the internal valve from the chamber to the inside space of the tire.

FIG. 4. shows another cross-sectional view of a tire, wherein a broken line shows penetration of gas through the external valve from the outside environment to the chamber.

FIG. 5. is still another cross-sectional view of a tire, wherein a broken line shows penetration of gas through the third valve from the tire to the outside environment.

DETAILED DESCRIPTION OF THE INVENTION

EXAMPLE 1

Figure 6:
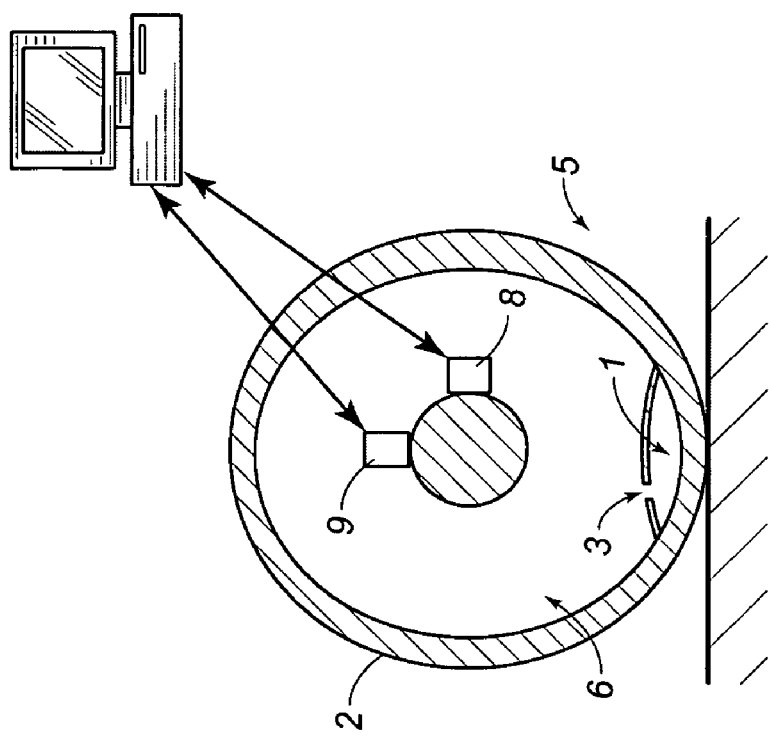
FIG. 6. shows a side elevation view of a tire with the first and second sensors placed next to the wheel rim. Both-sided arrows show transfer of information to the computer.

FIG. 1a) shows a tire 2, fitted with the device for monitoring, maintenance and adjustment of pressure in the tire 2. The device consists of a chamber 1, one wall of which is a part of the wall of the tire 2 tread, while the chamber 1 is connected through one internal valve 3 to the inside space 6 of the tire 2, it is then connected with one external valve 4 with the outside environment 5.

The chamber 1 volume is at its maximum at the moment when no load deforming the tire 2 caused by rolling of the tire 2 is applied. The chamber 1 is filled by the air from the outside environment 5 through the external valve 4.

When the tire 2 starts rolling on the road and is deformed at the place where the chamber 1 is located, higher pressure is generated in the chamber 1 than in the inside space 6 of the tire 2. The chamber 1 volume is reduced. The pressure is defined by unloaded volume of the chamber 1 or its part and volume of chamber 1 or its part when loaded, multiplied by the pressure of the outside environment 5, from which the chamber 1 is filled. If the pressure in the chamber 1 is higher than in the inside space 6 of the tire 2, by opening of the internal valve 3 the pressures in the chamber 1 is balanced with that in the inside space 6 of the tire 2. The pressure in the inside space 6 of the tire 2 gets proportionally higher.

During the decrease of loading deformation of the tire 2 at a place adjacent to the chamber 1 the chamber 1 returns to the original volume, the pressure in the chamber 1 is lower than it was in the chamber 1 without load, i. e. lower than the outside environment 5 pressure. By opening the external valve 4 the pressure in the chamber 1 gets balanced with that of the outside environment 5.

The chamber 1 may also be designed in the tire 2 casing so that unlike in FIG. 1 the chamber 1 volume is at its minimum at the moment when no load deformation of the tire 2 caused by rolling of the tire 2 is applied, and the volume of chamber 1 gets higher as a result of mechanical load and deformation of the tire 2 at the place adjacent to the chamber 1 wall. Lower pressure than in the outside environment 5 appears in the chamber 1. By opening the external valve 4 the pressure in the chamber 1 is balanced with the pressure in the outside environment 5. During decrease of load deformation of the tire 2 in the place adjacent to the chamber 1 the chamber 1 returns to its original volume, pressure higher than in the inside space 6 of the tire 2 occurs in the chamber 1 given by the volume of the chamber 1 or its part at the load and the volume of the chamber 1 or its part after the load and the pressure of the outside environment 5, from where the chamber 1 is filled. By opening the internal valve 3 the pressure in the inside space 6 of the tire 2 gets proportionally higher and the pressure in the chamber 1 balances with that in the inside space 6 of the tire 2.

As the external valve 4 is a one-way type, the pressure inside the chamber 1 is not balanced with the atmospheric pressure of the outside environment 5 at each cycle. All the amount of air sucked through the external valve 4, which was not compressed to the inside space 6 of the tire 2 through the internal valve 3 during the cycle stays inside the chamber 1.

EXAMPLE 2

FIG. 1b) shows a tire 2, fitted with the device for monitoring, maintenance and adjustment of pressure in the tire 2. The device consists of a chamber 1 located in the case at the side of the tire 2. The chamber 1 is connected with the inside space 6 of the tire 2 through one internal valve 3, with the outside environment 5 through one external valve 4 and the inside space 6 of the tire 2 is connected with the outside environment 5 through the third valve 7. The tire 2 deformed by the load is shown in FIG. 3. The pressure inside the chamber 1 is higher than inside space 6 the tire 2, the internal valve 3 is open and the gas from the chamber 1 flows to the inside space 6 of the tire 2. The gas flow direction is indicated by a broken arrow.

The tire 2 during finishing the load deformation or after the load deformation is shown in FIG. 4.

The external valve 4 is open and the gas from the outside environment 5 flows to the chamber 1. The gas flow direction is indicated by a broken arrow.

The third valve 7 serves for deflating the tire 2 in case of overpressure in the tire 2, as shown in FIG. 5. The third valve 7 is open and the air from the inside space 6 of the tire 2 flows to the outside environment 5. The gas flow direction is indicated by a broken arrow.

EXAMPLE 3

A convenient situation is, when the chamber 1 is longer then the length of the optimum contact surface of the tire 2, e. g. the length of the chamber 1 is a half of the tire 2 perimeter.

The chamber 1 is divided during the load deformation into two parts, the first one, where the load deformation has already occurred, and the second one, where the deformation is just under way. The walls of the chamber 1 are pressed hermetically to each other during the course of the load deformation of both the above parts of the chamber 1 and compressed gas is accumulated in the second part of the chamber 1. The gas pressure in the second part of the chamber 1, where the hermetic contact has not occurred yet increases proportionally to the decrease of the volume of the part of the chamber 1.

A chamber 1 designed this way prevents accidental or inconvenient inflation of the inside space 6 of the tire 2 if the load deformation is caused e. g. by a stone.

Suitable length and-suitable profile of the chamber 1 ensures, that the chamber 1 increases the pressure in the inside space 6 of the tire 2 if the load deformation corresponds to the under-inflated tire, and that it runs along the predetermined length of the tire 2 perimeter and is at least sufficient to form hermetic contact of the opposite walls of the chamber 1 along the predetermined length.

EXAMPLE 4

The tire 2 contents the chamber 1, internal valve 3, external valve 4, inside space 6 of the tire 2 and the third valve 7. It is then equipped by the first pressure sensor 8 (FIG. 6) and is surrounded by outside environment 5. The tire 2 is over-inflated. Upon the information from the first pressure sensor 8 the control regulates the third valve 7 connecting the inside space 6 of the tire 2 with the outside environment 5. The control evaluates the pressure in the inside space 6 of the tire 2 as a value exceeding the pressure limit pre-defined to the pressure sensor 8 and opens the third valve 7 connecting the inside space 6 of the tire 2 with the outside environment 5. The pressure in the inside space 6 of the tire 2 decreases until the moment when the first sensor 8 reaches the pre-defined limit.

The control closes the third valve 7 connecting the inside space 6 of the tire 2 with the outside environment 5.

The first pressure sensor 8 is a pressure gauge, to which the limit values of the inside space 6 pressure of the tire 2 are preset. When they are exceeded, the control opens or closes the internal valve 3, external valve 4 and/or the third valve 7.

The first sensor 8 of the tire 2 profile monitors and evaluates the distance of the first fixed point chosen on the inside of the tire 2 tread from another fixed point on the inside of the tire 2, closer to the axe of rotation of the tire 2. If the measured distance is during the course of the load deformation of the tire 2 between the limits preset to the first profile sensor 8 the control locks the possibility of opening the third valve 7, the internal valve 3 and the external valve 4.

If the distance measured during the course of the load deformation of the tire 2 is lower than the lowest limit preset to the first profile sensor 8, the control unlocks the external valve 4 connecting the chamber 1 with the outside environment 5 and simultaneously unlocks the internal valve 3 connecting the chamber 1 with the inside space 6 of the tire 2. This enables the chamber 1 to operate as described above, ensuring inflation of the inside space 6 of the tire 2.

Increasing pressure causes an increase of the distance between the points during the course of the deformation of the tire 2 until the moment when the distance reached the limit value preset to the first profile sensor 8. The control then locks the possibility of opening the internal valve 3 and/or the external valve 4.

The first sensor 8 of the chamber 1 profile monitors e. g. a distance between two chosen fixed points on two different walls of the chamber 1 and compares them with the limit values pressed to the first profile sensor 8 of the chamber 1.

The first sensor 8 of the chamber 1 volume monitors e. g. a distance between two chosen fixed points on two different walls of the chamber 1, the distance of which is proportionate to the chamber 1 volume and the control compares them with limit values pressed to the first volume sensor 8 of the chamber 1.

The first sensor 8 scanning the difference of pressures inside the chamber 1 and in the inside space 6 of the tire 2 and the difference of pressures inside the chamber 1 and the outside environment 5 may consist of a flexible membrane located in the wall separating the chamber 1 from the inside space 6 of the tire 2 or the chamber 1 from the outside environment 5, the camber of which is proportionate to the difference of pressures between the adjacent spaces. The control compares cambers with the limit values preset to the first pressure difference sensor 8.

EXAMPLE 5

The tire 2 contents the chamber 1, internal valve 3, external valve 4, inside space 6 of the tire 2 and the third valve 7. It is then equipped with the first sensors 8 and the second sensors 9 monitoring velocity of the tire 2 and/or winding of the tire 2 shown in FIG. 6. The tire 2 profile changes during driving, depending on the vehicle weight, speed and direction. If we want to grasp these effects and eliminate e. g. over-inflation of the tire 2 during turning, when the profile sensor 8 may indicate under-inflation and the control tries to inflate the tire 2 although it is not under-inflated, however the data received from the second sensor 9 prevent the inflation.

The second sensor 9 may then be used for increasing the pressure value, if the second sensor 9 of velocity scans higher speed or higher average speed of the vehicle and shifts the limit inflation value of the first sensor 8 of tire 2 pressure to higher level, recommended for the particular driving style. Similarly, when the vehicle slows down the control in co-operation with the second sensor 9 of velocity may decrease the pressure value preset in the first sensor 8.

The second sensor 9 of tire 2 rotation speed is based on a weight bearing upon the external valve 4 with force applied on the external valve 4 perpendicularly to the rotation axis of the tire 2 directly by the excentrifugal force directly proportional to the rotation speed of the tire 2. At higher speed, the excentrifugal force is higher, and makes the opening of the external valve 4 easier or harder according to the orientation of the force in the direction of opening or closing the valve 4. When the speed and the excentrifugal force are lower, the effect is reverse.

The first sensors 8 and the second sensors 9 can send the information about the tire 2 state to a computer that might be a part of the control system located in the car. The computer processes the information and can notify the vehicle operator visually or acoustically.

EXAMPLE 6

The inside of the chamber 1 is filled with the air from the outside environment at the moment when it is not deformed. At deformation corresponding to a correctly inflated tire 2 the chamber 1 is not substantially deformed and the pressure inside the chamber 1 does not substantially increase. On the other hand, when the tire 2 is under-inflated, the volume of the chamber 1 decreases and the pressure inside the chamber 1 increases to a value higher than that in the inside space 6 of the tire 2. The air from the chamber 1 is pressed into the inside space 6 of the tire 2 through the internal valve 3. At the moment when the chamber 1 is no more deformed it returns to its original shape, the pressure inside is lower than outside environment 5 and the chamber 1 sucks air through the external valve 4.

EXAMPLE 7

Two parts of chamber 1 are in the walls of the tire 2 mutually symmetrical to the plane perpendicular to the rotation axis of the tire 2. Both parts of the chamber 1 are interconnected. At least one internal valve 3 connects the chamber 1 with the inside space 6 of the tire 2. During the load deformation of the tire 2 the parts of the chamber 1 are deformed and the pressure inside them increases to a value higher than that in the inside space 6 of the tire 2. The internal valve 3 connecting the chamber 1 with the inside space 6 of the tire 2 opens and the pressure in the inside space 6 of the tire 2 increases. Location of the interconnected parts of the chamber 1 in the opposite side of the tire 2 reduces the possibility of inappropriate inflation of the inside space 6 of the tire 2 in situations when the sides of the tire 2 are loaded asymmetrically, which causes accidental or inappropriate inflation of the tire 2. Even if the parts of the chamber 1 are deformed differently, the pressure will be the same in both. The pressure in the inside space 6 of the tire 2 will only be increased through the internal valve 3 if the pressure value in the chamber 1 exceeds the value of inside space 6 of the tire 2.

EXAMPLE 8

Figure 7A:
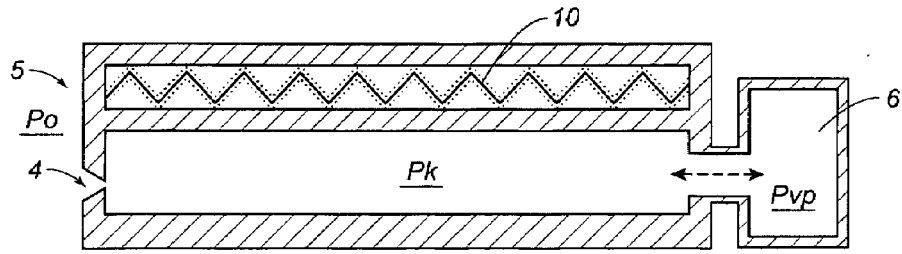
FIGS. 7a)–d) show sectional views of the individual function phases of the chamber connected by an external valve with the outside environment and freely connected with the inside space of the tire.

FIG. 7a) shows a pump consisting of chamber 1 the wall of which contents a block 10 with shape memory and the external valve 4 connecting the chamber 1 with the outside environment 5. The chamber 1 is freely connected to the inside space 6 of the tire 2. Free movement of the medium between the chamber 1 and the inside space 6 of the tire 2 is shown by broken double-sided arrows. Po is the pressure of the outside environment 5, Pk is the pressure in the chamber 1 and Pvp is the pressure in the inside space 6 of the tire 2. The medium freely flows between the chamber 1 and the inside space 6 of the tire 2. The external valve 4 is closed. Pk=Po=Pvp.

Figure 7B:
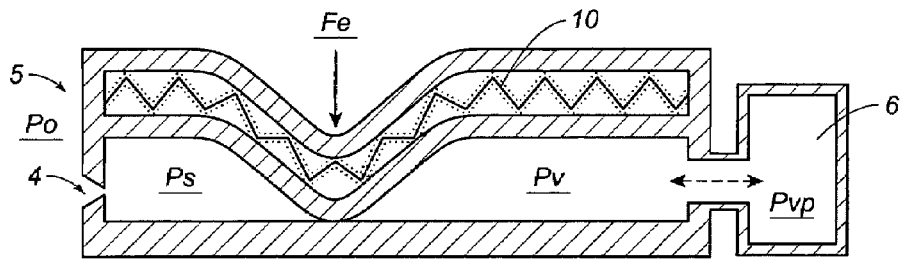

FIG. 7b) shows a force Fe applied to the chamber 1 wall with the shape memory block 10, higher than the limit force Fh. The chamber 1 walls are deformed and the cross section of the chamber has zero area at the point of touch. The zero cross section divides the chamber 1 into two separate parts. The pressure in the part of the chamber 1 between the external valve 4 and the zero cross section of the chamber 1 is the Ps. The pressure in the part of the chamber 1 between the zero cross section of the chamber 1 and the free connection with the inside space 6 of the tire 2 is Pv.

Figure 7C:
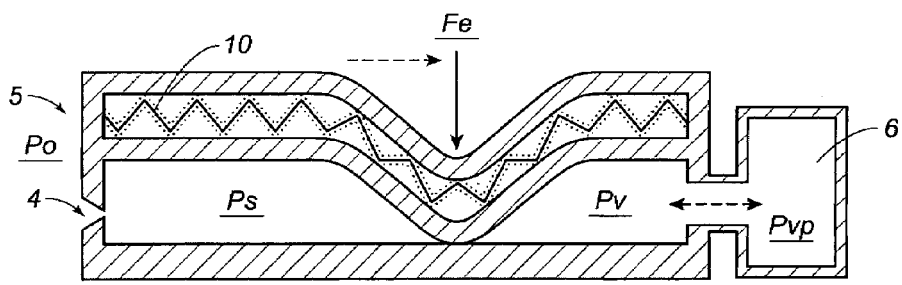

The point of application of force Fe shifts in direction from the external valve 4 to the place of free connection with the inside space 6 of the tire 2, while the force Fe is still higher than the limit force Fh until it gets to the position shown in FIG. 7c). The place of deformation of the wall of the chamber 1 and the place of deformation of block 10 with shape memory and the zero cross section of the chamber 1 shift simultaneously along the chamber 1. The block 10 with shape memory returns to the original state before deformation at the place where force Fe applied in FIG. 7b). The volume of the space closed in the space of the chamber 1 between the external valve 4 and the zero cross section of the chamber 1 increases and medium from the outside environment 5 flows inside through the open external valve 4. The flow of the medium through the external valve 4 is indicated by a one-direction broken arrow. Pressures Po=Ps. The volume of the space between the zero cross section of the chamber 1 and the place of free connection with the inside space 6 of the tire 2 decreases and the medium pressure increases. Pressures Pv=Pvp>Po=Ps.

Figure 7D:
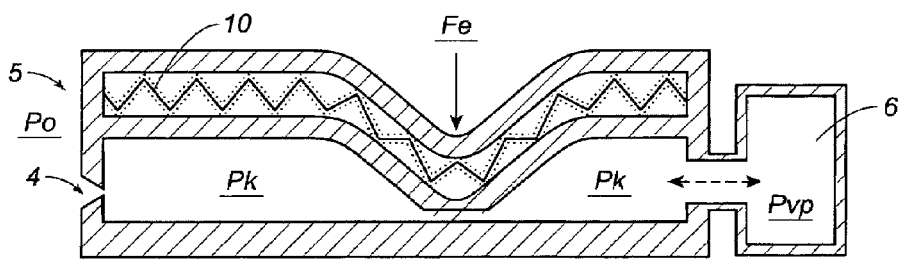

The force Fe in FIG. 7d) is lower than the limit force Fh and the zero cross section of the chamber 1 disappears. The medium flows freely between all parts of the chamber 1 and the inside space 6 of the tire 2. The external valve 4 is closed. Pk=Pvp>Po. After full fade out of force Fe the chamber 1 returns to the state shown in FIG. 1a). The pressures Pk=Pvp>Po. The pressure inside the common space of the chamber 1 and the inside space 6 of the tire 2 has risen proportionally to the medium closed in these spaces.

EXAMPLE 9

Figure 8A:
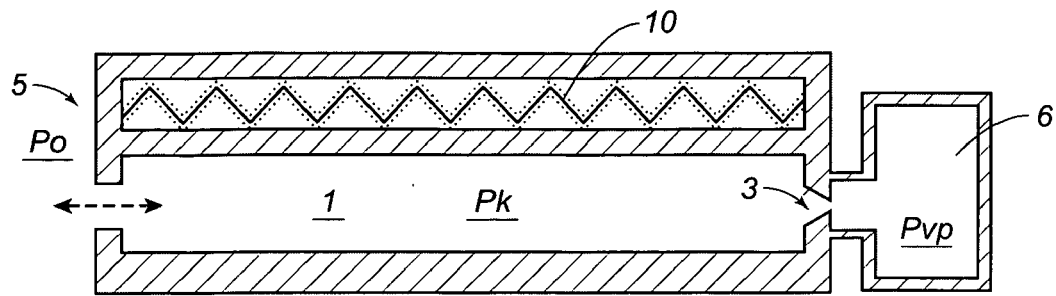
FIGS. 8a)–d) show sectional views of the individual function phases of the chamber connected by an internal valve with the inside space of the tire and freely connected with the outside environment.

FIG. 8a) shows a pump consisting of the chamber 1, the wall of which contains the block 10 with shape memory, internal valve 3, connecting the chamber 1 with the inside space 6 of the tire 2. The chamber 1 is freely connected with the outside environment 5. The free flow of the medium between the chamber 1 and the outside environment 5 is indicated by a two-direction broken arrow. Po is the outside environment 5 pressure, Pk is the pressure in the chamber 1 and Pvp is the pressure in the inside space 6 of the tire 2. The internal valve 3 is closed. Pk=Po=Pvp.

Figure 8B:
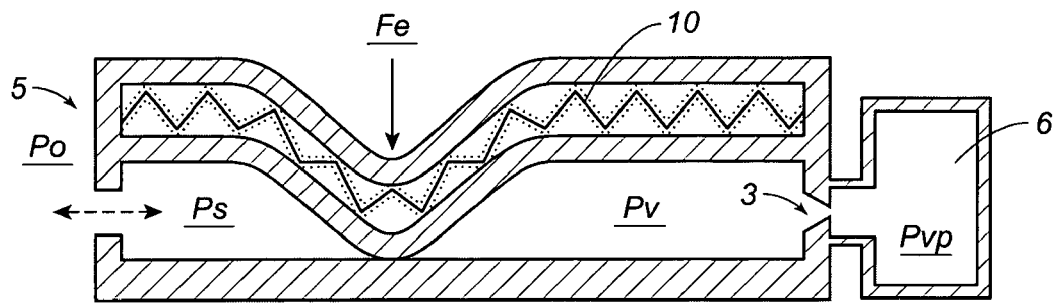

FIG. 8b) shows force Fe higher than the limit force Fh, which has started applying to the wall of the chamber 1 containing the block 10 with shape memory.

The chamber 1 walls are deformed and at the place where they touch each other the cross section is zero. The zero cross section divides the chamber 1 into two separate parts. The pressure in the part of the chamber 1 between the place of free connection with the outside environment 5 and the zero cross section of the chamber 1 is Ps=Po. The pressure between the zero section and the internal valve 3 is Pv. The internal valve 3 is open and Pv=Pvp.

Figure 8C:
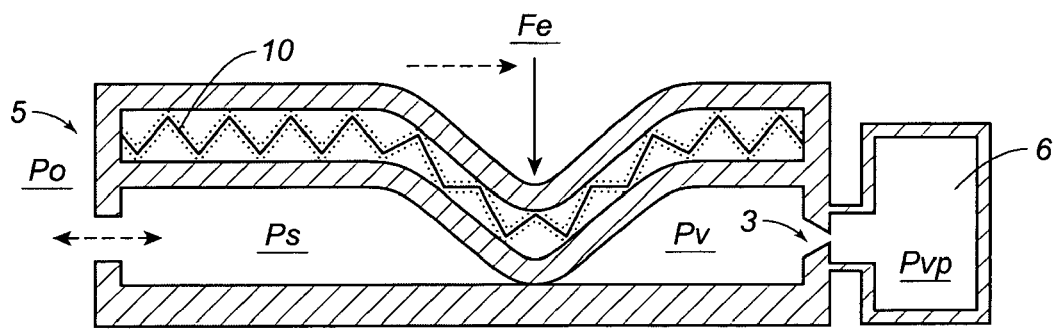

The application point of force Fe shifts from the place of free connection with the outside environment 5 towards the internal valve 3, while the force Fe is still higher than the limit force Fh until it gets to the position shown in FIG. 8c). The place of deformation of the wall of the chamber 1 and the place of deformation of block 10 with shape memory and the zero cross section of the chamber 1 shift simultaneously along the chamber 1. The block 10 with shape memory returns to the original state before deformation at the place where force Fe applied in FIG. 8b). The volume of the space of the chamber 1 closed between the free connection with the outside environment 5 and the zero cross section of the chamber 1 increases and the medium freely flows inside from the outside environment 5. The flow of the medium is indicated by a broken arrow. The pressures Po=Ps. The volume of the part of the chamber 1 between the zero cross section and the internal valve 3 decreases and the medium pressure increases. The medium flows to the inside space 6 of the tire 2 through the open internal valve 3. The flow of the medium is indicated by a broken arrow. The pressures Pv=Pvp>Po=Ps.

Figure 8D:
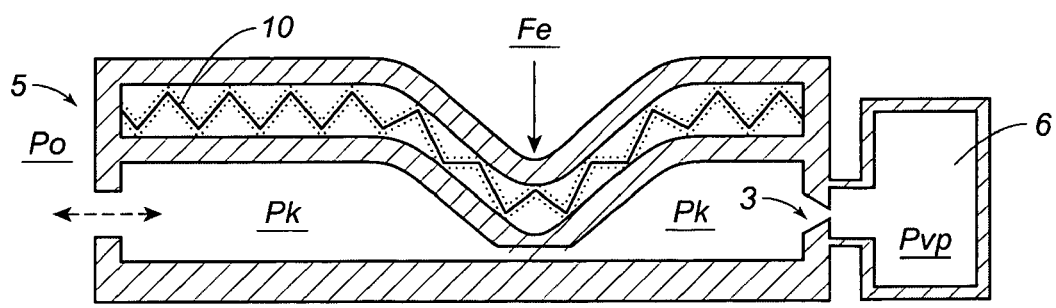

The force Fe in FIG. 8d) is lower than the limit force Fh and the zero cross section of the chamber 1 disappears. The medium flows freely between all parts of the chamber 1 and the outside environment 5 of the tire 2. The internal valve 3 is closed. Pk=Po<Pvp. The amount of medium closed in the inside space 6 of the tire 2 increased by the amount pressed in from the chamber 1 through the internal valve 3 from the moment when the zero cross section of the chamber 1 shown in FIG. 8b) occurred, till the moment of its fade out shown in FIG. 8d).

After full fade out of force Fe the chamber 1 returns to the state shown in FIG. 8a). The pressures Pvp>Pk=Po. The pressure in the inside space 6 of the tire 2 has risen proportionally to the medium closed in this space.

EXAMPLE 10

Figure 9A:
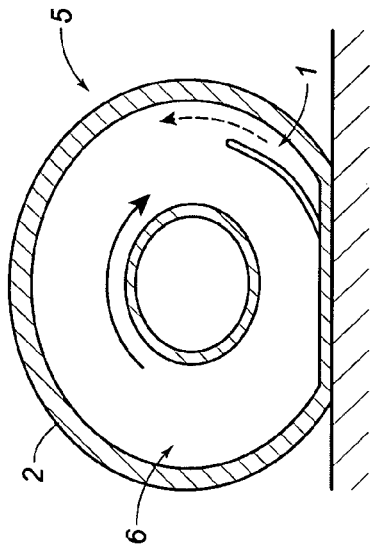
FIGS. 9a)–d) show side elevation views of a tire and the chamber connected by an external valve with the outside environment and freely connected with the inside space of the tire in different phases of tire rotation.

FIG. 9a) shows a cross section through the tire 2, its inside space 6, chamber 1, external valve 4 and the outside environment 5, the ambient environment of the tire 2. The chamber 1 is freely connected with the inside space 6 of the tire 2.

Figure 9B:
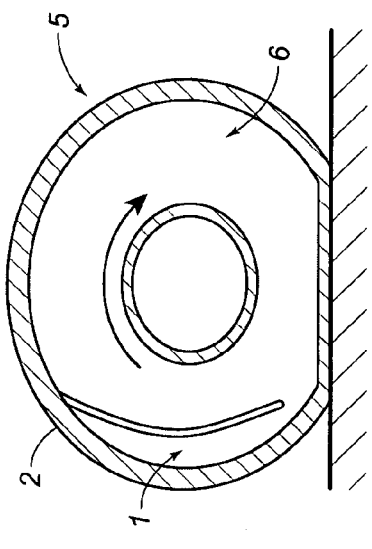
Figure 9C:
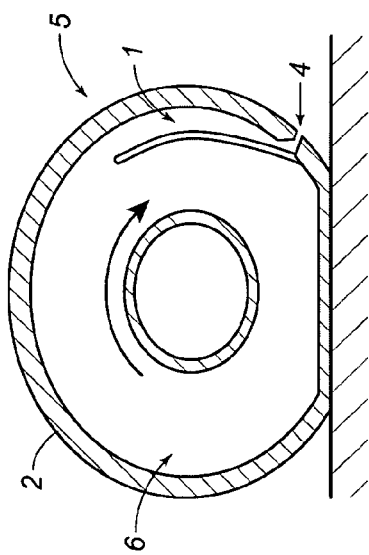

The bent arrow shows the direction of rotation of the tire 2, together with the chamber 1. The external valve 4 is closed. Force Fe higher than the limit force Fh in FIG. 9b) starts applying on the chamber 1 as a result of deformation of the tire 2, the chamber 1 is deformed and its part has a zero cross section. The gas from the chamber 1 is pressed to the inside space 6 of the tire 2. The direction of compression is indicated by a broken arrow. FIG. 9c) shows the chamber 1 divided by the zero cross section into two parts, while in the first part of chamber 1, which has passed the zero cross section and all the gas which was inside it before the deformation was compressed to the rest of the chamber 1 and to the inside space 6 of the tire 2, the pressure is lower than the pressure of the outside environment 5 and this part is filled through the open external valve 4 with gas from the outside environment 5. In the course of deformation of the chamber 1 and the zero cross section passing through it, all the gas contained in the chamber 1 at the beginning of the deformation is compressed to the inside space 6 of the tire 2, and the empty chamber is filled with gas from the outside environment 5 through the external valve 4. The external valve 4 gets closed.

Figure 9D:
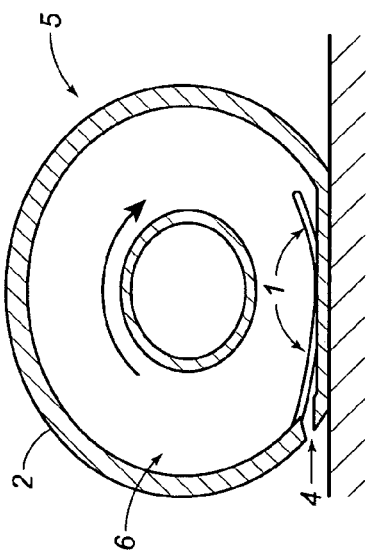

After that, all the chamber 1 is connected with the inside space 6 of the tire 2, as shown in FIG. 9d). The pressure inside the whole chamber 1 with the inside space 6 of the tire 2 is higher than before the beginning of the cycle shown in FIG. 9a).

EXAMPLE 11

Figure 10A:
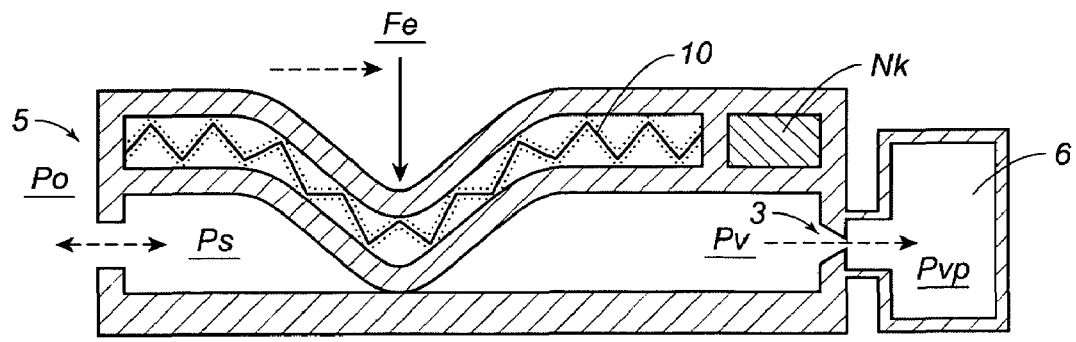
FIGS. 10a)–c) show sectional views of the individual function phases of the chamber connected by an internal valve with the inside space of the tire and freely connected with the outside environment, while a part of the chamber marked Nk is not deformable by force Fe.
Figure 10B:
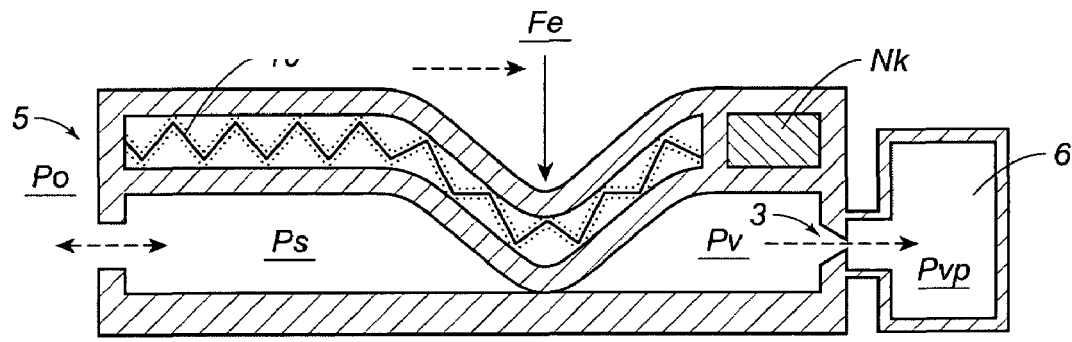

FIGS. 10a) and 10b) show a part of the chamber 1, the wall of which contents block 10 with shape memory, non-deformable part of the chamber Nk, an internal valve 3 connecting the chamber with the inside space 6 of the tire 2.

Force Fe is applied on the chamber 1, shifting in the direction of the dotted arrow.

Figure 10C:
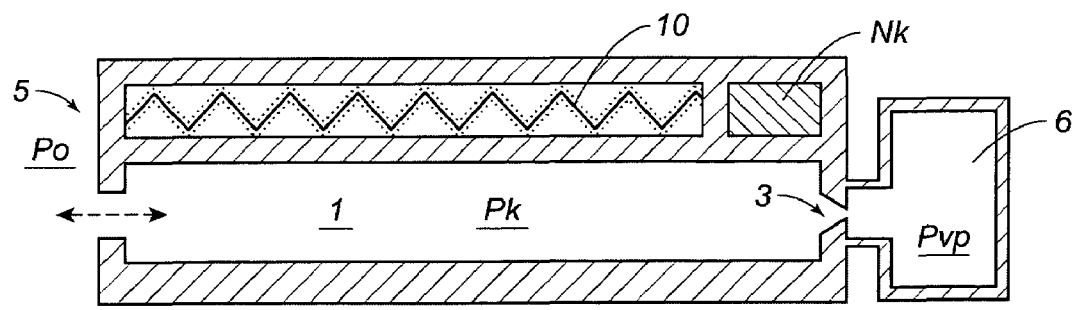

The zero cross sectional area of the chamber 1 compresses the medium and forces it into the inside space 6 of the tire 2 through the internal valve 3. The zero cross section passes along the chamber 1. FIG. 10c) shows the force Fe applied on the wall of the chamber 1 in the part Nk, which is not deformable. The force Fe no longer forms the zero cross section and all the parts of the chamber 1 are connected.

EXAMPLE 12

Figure 11A:
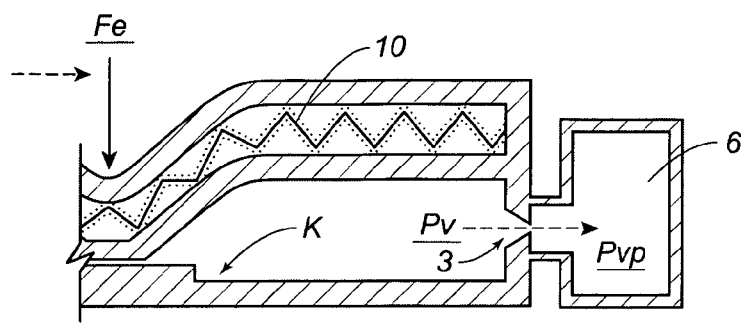
FIGS. 11a)–d) show more sectional views of the function phases of the chamber in various views connected by an internal valve with the inside space of the tire and including channel K.
Figure 11B:
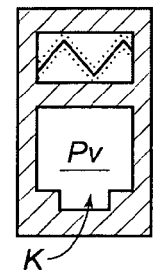
Figure 11C:
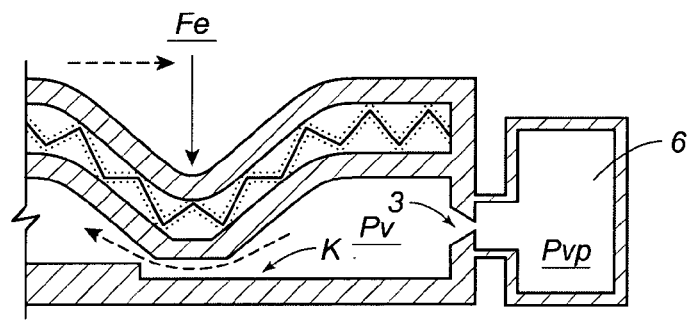
Figure 11D:
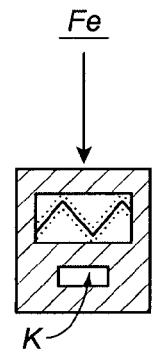

FIG. 11a) shows a part of the chamber 1, the wall of which contents block 10 with shape memory, an internal valve 3 connecting the chamber 1 with the inside space 6 of the tire 2. Then there is a channel K going through the lower wall of the chamber 1. FIG. 11b) shows a section of this chamber 1 and channel K in a part of the chamber not deformed. Force Fe is applied on the chamber 1, shifting in the direction of the dotted arrow. The zero section of the chamber 1 compresses the medium and forces it into the inside space 6 of the tire 2 through the internal valve 3. The zero cross section passes along the chamber 1 until it gets to the position shown on FIG. 11c) and 11d). In this position the zero cross section has already passed the edge of the channel K, which connected all the parts of the chamber 1 regardless the size of the force Fe. The zero cross section of the chamber 1 has disappeared. The medium flowing through the channel K between all parts of the chamber is indicated by a slim bent arrow.

INDUSTRIAL APPLICABILITY

The device according to the invention is applicable in the automotive industry.

I claim:

1. The apparatus for monitoring, maintaining and adjustment of pressure comprising:
    a tire having an interior space and a wall, said tire being suitable for receiving external mechanical forces when rolling on a road surface;
    a chamber having a shape memory, said chamber being deformable during the receiving of the external mechanical forces, said chamber having a lengthwise shape at least partially copying a shape of said tire, said chamber being connected with said interior space of said tire and an outside environment, at least one wall of said chamber being either adjacent to said wall of said tire or being part of said wall of said tire, a portion of said chamber being deformable up to a zero cross section, said chamber having a block with shape memory, said chamber being freely open at one end to an outside environment and having at least one internal valve at or adjacent to an opposite end, said at least one internal valve connecting said chamber to said interior space of said tire, said opposite end of said chamber being deformable so as to have a cross-sectional area greater than zero.

2. The apparatus of claim 1, one of said ends of said chamber having the internal valve, said end being located outside an area of application of external mechanical forces deforming said chamber up to a zero cross-section.

3. The apparatus of claim 1, further comprising:
    at least one status sensor selected from the group consisting of a tire pressure sensor, a tire profile sensor, a chamber profile sensor, a chamber volume sensor, a sensor reading a difference between a pressure inside said chamber and a pressure on the interior space of said tire, said sensor reading a difference of pressure inside said chamber and the outside environment, said at least one status sensor being connected by a control to said internal valve.

4. The apparatus of claim 1, further comprising:
    at least one movement sensor selected from the group consisting of a tire rotation speed sensor and a tire rotation acceleration sensor, said at least one movement sensor being connected by a control to said internal valve.

5. The apparatus of clam, 1, said end being deformable so as to have a cross-sectional area greater than zero, having a minimum volume which is 1% to 80% of maximum volume of the chamber.

6. The apparatus of monitoring, maintaining and adjustment of pressure comprising:
    a tire having an interior space and a wall, said tire being suitable for receiving external mechanical forces when rolling on a road surface;

a chamber having a shape memory, said chamber being deformable during the receiving of the external mechanical forces, said chamber having a lengthwise shape at least partially copying a shape of said tire, said chamber being connected with said interior space of said tire and an outside environment, at least one wall of said chamber being either adjacent to said wall of said tire or being part of said wall of said tire, at least a portion of said chamber being deformable up to a zero cross section, said chamber having a block with shape memory, said chamber being freely open at one end to an interior space of said tire and having at least one external valve at or adjacent to an opposite end, said at least one external valve connecting said chamber to said outside environment.

7. The apparatus of claim 6, said opposite end being deformable so as to have a cross-sectional area greater than zero.

8. The apparatus of claim 6, one of said ends of said chamber having the external valve, said end being located outside an area of application of external mechanical forces deforming said chamber up to a zero cross-section.

9. The apparatus of claim 6, further comprising:
at least one status sensor selected from the group consisting of a tire pressure sensor, a tire profile sensor, a chamber profile sensor, a chamber volume sensor, a sensor reading a difference between a pressure inside said chamber and a pressure on the interior space of said tire, said sensor reading a difference of pressure inside said chamber and the outside environment, said at least one status sensor being connected by a control to said external valve.

10. The apparatus of claim 1, further comprising:
at least one status sensor selected from the group consisting of a tire pressure sensor, a tire profile sensor, a chamber profile sensor, a chamber volume sensor, a sensor reading a difference between a pressure inside said chamber and a pressure on the interior space of said tire, said sensor reading a difference of pressure inside said chamber and the outside environment; and
at least one movement sensor selected from the group consisting of a tire rotation speed sensor and a tire rotation acceleration sensor, said internal valve being connected by a control to said at least one status sensor and said at least one movement sensor.

11. The apparatus of claim 6, further comprising:
at least one movement sensor selected from the group consisting of a tire rotation speed sensor and a tire rotation acceleration sensor, said at least one status sensor being connected by a control to said external valve.

12. The apparatus of claim 6, further comprising:
at least one status sensor selected from the group consisting of ate pressure sensor, a tire profile sensor, a chamber profile sensor, a chamber volume sensor, a sensor reading a difference between a pressure inside said chamber and a pressure on the interior space of said tire, said sensor reading a difference of pressure inside said chamber and the outside environment; and
at least one movement sensor selected from the group consisting of a tire rotation speed sensor and a tire rotation acceleration sensor, said external valve being connected by a control to said at least one status sensor and said at least one movement sensor.

13. The apparatus of claim 6, said end being deformable so as to have a cross-sectional area greater than zero, having a minimum volume which is 1% to 80% of maximum volume of the chamber.

* * * * *